US010509750B2

(12) United States Patent
Sachidanandam et al.

(10) Patent No.: US 10,509,750 B2
(45) Date of Patent: Dec. 17, 2019

(54) SYSTEM AND METHOD FOR CONTROLLING MULTI-FUNCTION PINS IN MANAGEMENT CONTROLLER STACK

(71) Applicant: American Megatrends International, Inc., Norcross, GA (US)

(72) Inventors: Pavithra Sachidanandam, Duluth, GA (US); Rajeswari Ravichandran, Duluth, GA (US); Baskar Parthiban, Johns Creek, GA (US); Rajamanickam T, Karur (IN); Senathipathy Thangavel, Chennai (IN); Arvind Bisht, Chennai (IN)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 131 days.

(21) Appl. No.: 15/657,754

(22) Filed: Jul. 24, 2017

(65) Prior Publication Data

US 2019/0026240 A1  Jan. 24, 2019

(51) Int. Cl.
*G06F 13/36* (2006.01)
*G06F 13/42* (2006.01)
*G06F 3/0482* (2013.01)

(52) U.S. Cl.
CPC ............. *G06F 13/36* (2013.01); *G06F 13/42* (2013.01); *G06F 3/0482* (2013.01); *G06F 2213/0016* (2013.01)

(58) Field of Classification Search
CPC ........ G06F 13/36; G06F 13/42; G06F 13/385; G06F 3/0482; G06F 2213/0016
See application file for complete search history.

(56) References Cited

U.S. PATENT DOCUMENTS

| 5,511,182 A * | 4/1996 | Le ....................... G06F 12/1441 |
| | | 711/E12.101 |
| 5,847,450 A * | 12/1998 | Fink ........................ G06F 13/40 |
| | | 257/697 |
| 2015/0286362 A1* | 10/2015 | Chandaria ............. G06F 3/0484 |
| | | 715/771 |

\* cited by examiner

*Primary Examiner* — Nimesh G Patel
(74) *Attorney, Agent, or Firm* — Locke Lord LLP; Tim Tingkang Xia, Esq.

(57) ABSTRACT

Systems and methods for controlling multi-function general purpose input/output (GPIO) pins in a management controller stack, such as a baseboard management controller (BMC) stack. The system includes a management controller, which includes multiple pins. The management controller provides multiple functionalities, and each of the functionalities is related to at least one of the pins. In operation, the management controller provides a graphic user interface, which shows the functionalities, allowing the user to input an instruction to select one of the functionalities. Upon receiving the selected functionality, for each of the pins related to the selected functionality, the management controller sets a value of a corresponding register to indicate a functional status of the pin, such that the pins may provide the selected functionality based on the value of the corresponding registers.

17 Claims, 3 Drawing Sheets

GPIOC0/SD1CLK/SCL10

GPIOC1/SD1CMD/SDA10

GPIOC2/SD1DAT0/SCL11

...

...

GPIOC/SD/I2C

GPIOE0/NCTS3

GPIOE1/NDCD3

GPIOE/UART

SYSTEM AND METHOD FOR CONTROLLING MULTI-FUNCTION PINS IN MANAGEMENT CONTROLLER STACK

FIELD

The present disclosure relates generally to management controller technology, and more particularly to systems and methods for controlling multi-function general purpose input/output (GPIO) pins in a management controller stack, such as a baseboard management controller (BMC) stack.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In the firmware of a management controller such as a BMC, general-purpose input/output (GPIO) pins can be programmed as input/output based on a platform. Each pin can also provide multiple functions based on a system on chip (SOC), and the pins may be configured via system control unit (SCU) registers. When a pin is programmed for a particular functionality, the other functionalities of the pin have to be disabled. Otherwise, it will cause malfunction of particular functionality of the system or the system itself. Currently, there is no generic mechanism to program the GPIO pins for multiple functionalities.

Therefore, an unaddressed need exists in the art to address the aforementioned deficiencies and inadequacies.

SUMMARY

Certain aspects of the present disclosure relate to a system, which includes a management controller. The management controller includes a plurality of pins, a processor and a non-volatile memory storing computer executable code. The management controller is configured to provide a plurality of functionalities, and each of the functionalities is related to at least one of the pins. The computer executable code, when executed at the processor, is configured to: receive an instruction to select one of the plurality of functionalities; determine the at least one pin related to the selected one of the functionalities based on the instruction; and for each of the at least one pin related to the selected one of the functionalities, set a value of a corresponding register to indicate a functional status of the pin, such that each of the at least one pin is configured to provide the selected one of the functionalities based on the value of the corresponding register.

Certain aspects of the present disclosure relate to a method for configuring a plurality of pins of a management controller. In certain embodiments, the method includes: receiving, at the management controller, an instruction to select one of a plurality of functionalities provided by the management controller, wherein each of the functionalities is related to at least one of the pins; determining, by the management controller, the at least one pin related to the selected one of the functionalities based on the instruction; and for each of the at least one pin related to the selected one of the functionalities, setting, by the management controller, a value of a corresponding register to indicate a functional status of the pin, such that each of the at least one pin is configured to provide the selected one of the functionalities based on the value of the corresponding register.

Certain aspects of the present disclosure relate to a non-transitory computer readable medium storing computer executable code. In certain embodiments, the computer executable code may be the firmware or modules stored in the non-volatile memory as described above. The computer executable code, when being executed at a processor of a management controller having a plurality of pins, may be configured to: receive an instruction to select one of a plurality of functionalities provided by the management controller, wherein each of the functionalities is related to at least one of the pins of the management controller; determine the at least one pin related to the selected one of the functionalities based on the instruction; and for each of the at least one pin related to the selected one of the functionalities, set a value of a corresponding register to indicate a functional status of the pin, such that each of the at least one pin is configured to provide the selected one of the functionalities based on the value of the corresponding register.

In certain embodiments, for each of the functionalities, each of the pins related to the functionality is configured to provide the functionality by being enabled to perform a function related to the functionality, or being disabled to avoid performing a function in conflict with the functionality.

In certain embodiments, each of the pins is a general-purpose input/output (GPIO) pin, and the functionalities comprise a GPIO functionality and at least one non-GPIO functionality.

In one embodiment, the at least one non-GPIO functionality includes a Secure Digital (SD) controller functionality.

In certain embodiments, the pins include a first multi-function pin and a second multi-function pin related to both the SD controller functionality and the GPIO functionality. When the SD controller functionality is selected, the first multi-function pin is configured to provide a SD clock signal function, and the second multi-function pin is configured to provide a SD command signal function. When the GPIO functionality is selected, each of the first multi-function pin and the second multi-function pin is respectively configured to provide an independent GPIO function.

In certain embodiments, the at least one non-GPIO functionality includes an Inter-Integrated Circuit (I2C) functionality.

In certain embodiments, the at least one non-GPIO functionality includes a universal asynchronous receiver/transmitter (UART) functionality.

In certain embodiments, the corresponding register for each of the pins is a system control unit (SCU) register.

In certain embodiments, the computer executable code, when executed at the processor, is further configured to: provide a graphic user interface, and display the functionalities in the graphic user interface.

In certain embodiments, the computer executable code, when executed at the processor, is further configured to: for the selected one of the functionalities, display each of the pins related to the selected one of the functionalities in the graphic user interface.

In certain embodiments, the management controller is a baseboard management controller (BMC).

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain embodiments, a mechanism may be provided for configuration functionalities of the pins of a management controller with functionalities as GPIO or as a specific module. The functionalities of the pins may be configured based on different platforms. To select a specific function for one of the pins, the configuration action may include enabling one function and disabling other functions of the pin. In certain embodiments, the configuration mechanism may be implemented in u-boot for prior initialization enabling proper communication with other modules on the server such as basic input/output system (BIOS) or platform controller hub (PCH). The mechanism is also able to take care the GPIO initialization, where the pins are used as GPIO, but not used by modules like Inter-Integrated Circuit (I2C), universal asynchronous receiver/transmitter (UART), or other non-GPIO functionalities. Therefore, the direction and logical state of the pins can be initialized based on the requirements. When used with different platforms, the control of the pins can be easily performed using the configuration mechanism.

Figure 1:
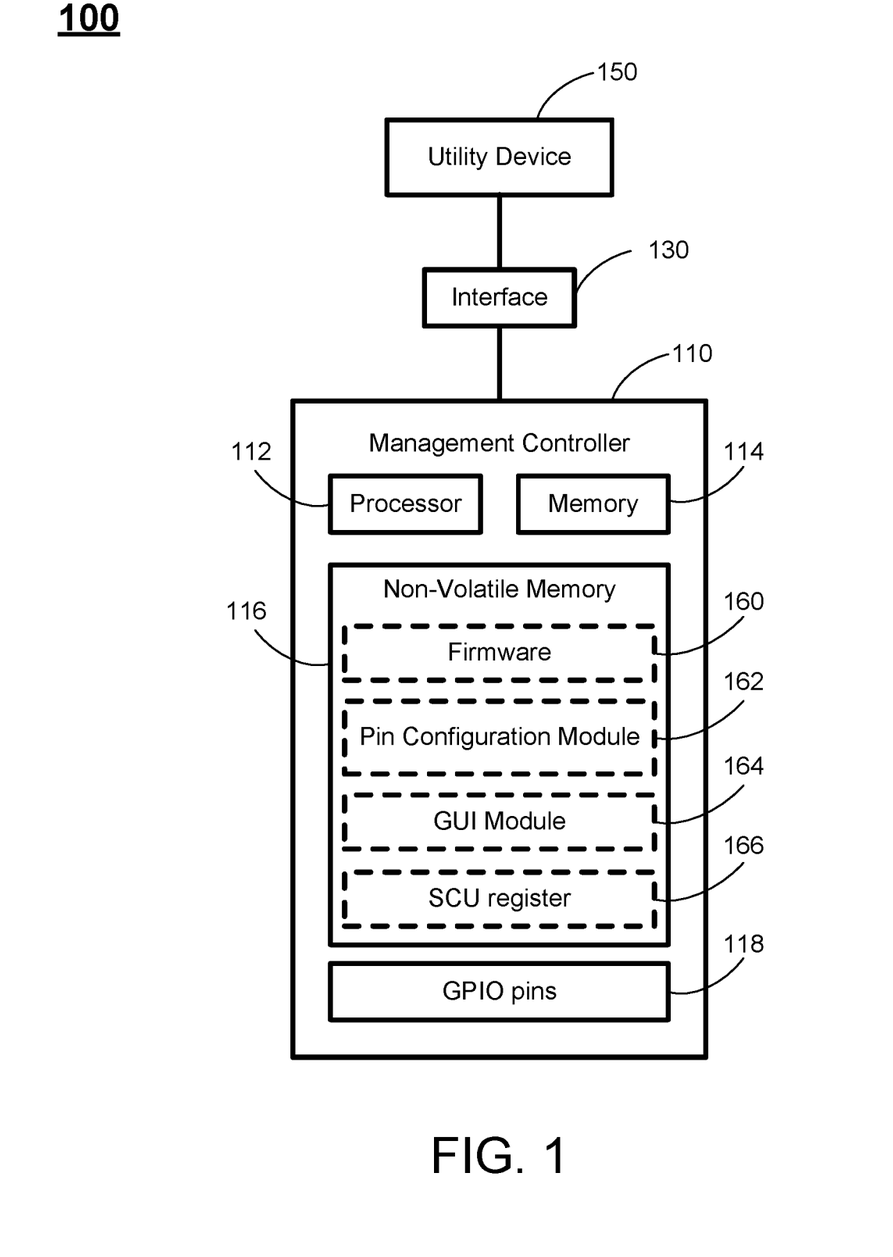
FIG. 1 schematically depicts an exemplary system according to certain embodiments of the present disclosure.

In accordance with the purposes of present disclosure, as embodied and broadly described herein, in certain aspects, the present disclosure relates to a system having a utility device and a management device in communication with the utility device. FIG. 1 schematically depicts an exemplary system according to certain embodiments of the present disclosure. As shown in FIG. 1, a system 100 includes a management controller 110, which is connected to a utility device 150 via an interface 130.

The utility device 150 may be a computing device or a device for other utilities. For example, the utility device 150 may be a SD card device being controlled by the management controller 110 as a SD controller. When the utility device 150 is a computing device, the computing device may function as a server or a host computer of the management controller 110. In certain embodiments, the computing device may be a general purpose computer, a specialized computer, or a headless computer.

The management controller 110 is a microcontroller used to monitor the operation of the utility device 150 via the interface 130. In certain embodiments, when the utility device 150 is a computing device, the management controller 110 may be a component on the baseboard of that computing device 150 for monitoring the operation of the computing device 110. In certain embodiments, the management controller 110 is a separated component from the computing device 150, and the interface 130 may be present between the computing device 150 and the management controller 110. In certain embodiment, the interface 130 may be a system interface, a universal serial bus (USB) interface or a network, or any other types of interfaces to communicatively connect the management controller 110 to the computing device 150. In certain embodiments, the management controller 110 may be implemented by a SOC, such as a BMC or a service processor (SP), or by other types of management controllers. The BMC refers to a specialized microcontroller that manages the interface between system management software and platform hardware. Different types of sensors can be built into the computing device, and the BMC reads these sensors to obtain parameters such as temperature, cooling fan speeds, power status, OS status, etc. The BMC monitors the sensors and can send alerts to a system administrator via a network if any of the parameters do not stay within preset limits, indicating a potential failure of the computing device. The administrator can also remotely communicate with the BMC to take some corrective action such as resetting or power cycling the system to get a hung OS running again.

In certain embodiments, the management controller 110 may include necessary hardware and software components to perform certain predetermined tasks. For example, as shown in FIG. 1, the management controller 110 includes a processor 112, a memory 114, a non-volatile memory 116, and a plurality of GPIO pins. Further, the management controller 110 may include other hardware components and software components (not shown) to perform its corresponding tasks. Examples of these hardware and software components may include, but not limited to, other required memory, interfaces, buses, I/O modules and peripheral devices.

The processor 112 is configured to control operation of the management controller 110. In certain embodiments, the processor 112 may be a central processing unit (CPU). The processor 112 can execute any computer executable code or instructions, such as the firmware 160, the pin configuration module 162, the graphical user interface (GUI) module 164, and the SCU register 166 of the management controller 110 or other applications and instructions of the management controller 110. In certain embodiments, the management controller 110 may run on more than one processor, such as two processors, four processors, eight processors, or any suitable number of processors.

The memory 114 can be a volatile memory, such as the random-access memory (RAM), for storing the data and information during the operation of the management controller 110. In certain embodiments, the memory 114 may be a volatile memory array.

The non-volatile memory 116 is a data storage media for storing the applications of the management controller 110. Examples of the non-volatile memory 116 may include flash memory, memory cards, USB drives, hard drives, floppy disks, optical drives, or any other types of non-volatile data storage devices. In certain embodiments, the management controller 110 may have multiple non-volatile memory modules 116, which may be identical storage devices or different types of storage devices, and the applications may be stored in one or more of the non-volatile memory 116 of the management controller 110.

Each of the GPIO pins 118 is a multi-function pin that may be used to provide GPIO and other functionalities. In certain embodiments, the functionalities provided by the GPIO pins 118 may include GPIO functionalities and non-GPIO functionalities, and each of the functionalities may involve one or more of the GPIO pins 118. For example, each of the GPIO pins 118 may independently function as GPIO, which provides the GPIO function independent from other pins 118. In certain embodiments, a group of the GPIO pins 118 may be configured to perform a non-GPIO functionality, which may be based on the requirements of the utility device 150 or platforms that the management controller 110 manages. Example of the non-GPIO functionalities may include, without being limited thereto, SD control functionalities, I2C functionalities, UART functionalities, or other types of functionalities. Typically, the manufacturer or vendor of the management controller 110 may provide a SOC datasheet for the management controller 110, which provides a specific layout of the GIPO pins 118 on the management controller 110, the information of the multiple functions provided by each of the GPIO pins 118, and the control mechanism of the GPIO pins.

Figure 2:
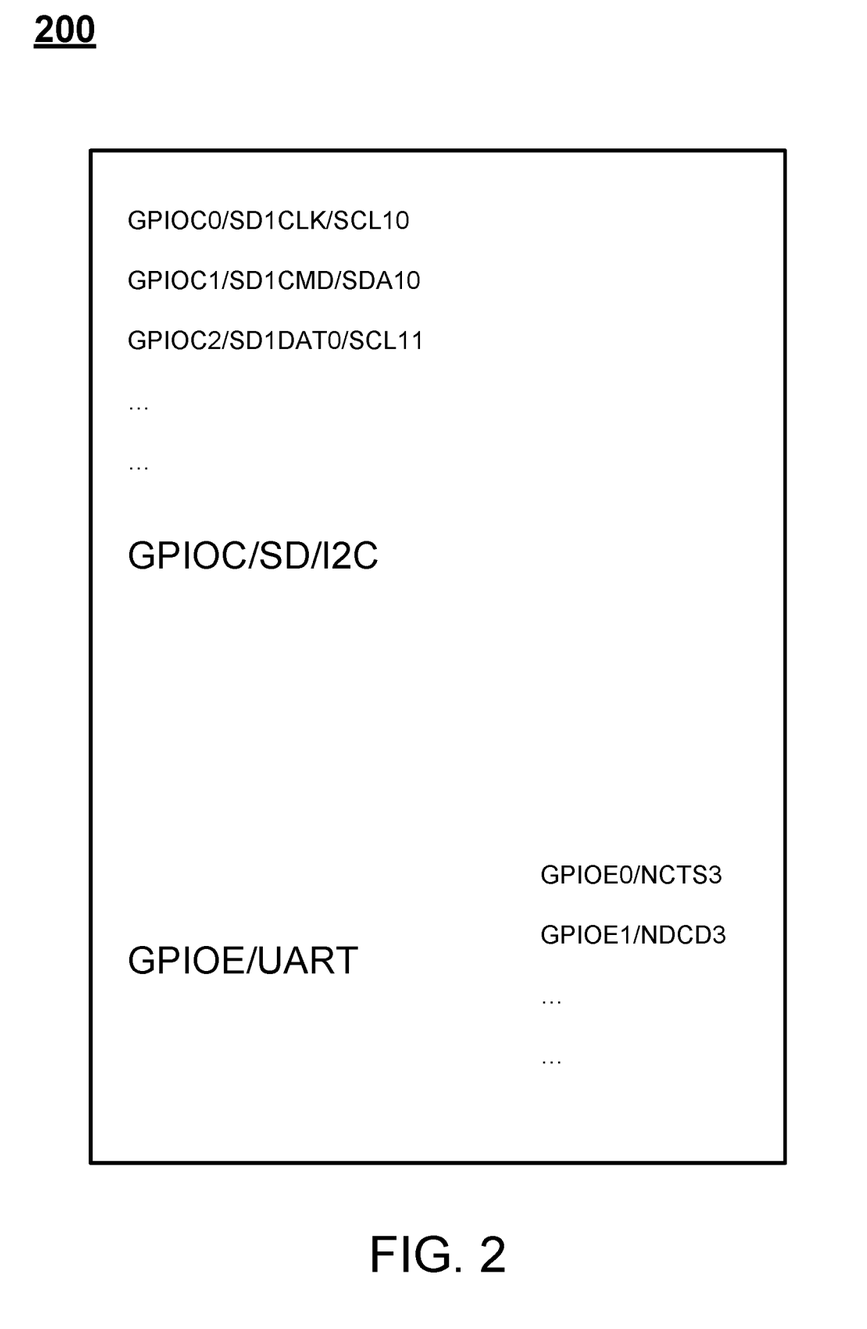
FIG. 2 schematically depicts a partial SOC datasheet of a management controller according to certain embodiments of the present disclosure.

FIG. 2 schematically depicts a partial SOC datasheet of a management controller according to certain embodiments of the present disclosure. As shown in FIG. 2, the datasheet 200 includes multiple items, and each item refers to the available functions for one of the GPIO pins 118 of the management controller 110. For example, the first GPIO pin listed on the datasheet is a GPIOC0/SD1CLK/SCL10 pin, which indicates the GPIO function (GPIOC0) and the non-GPIO functions (SD1CLK/SCL10) that the specific GPIO pin 118 may be configured. It should be noted that the GPIO pins 118 may be divided into groups by functions. For example, the datasheet 200 includes two groups, including a GPIOC/SD/I2C group and a GPIOE/UART group. The GPIO pins 118 in the GPIOC/SD/I2C group may be configured for the GPIO functionality (i.e., as GPIO), or may be configured for non-GPIO functionalities such as SD and I2C. The GPIO pins 118 in the GPIOE/UART group may be configured for the GPIO functionality (i.e., as GPIO), or may be configured for non-GPIO functionalities such as UART. Since the datasheet 200 is a partial SOC datasheet, the management controller 110 may include other groups that provide other non-GPIO functionalities.

In certain embodiments, the function of the GPIO pins 118 may be configured using a project (PRJ) file. Each platform may have its own requirement for GPIO. Some GPIO pins 118 may be used as GPIO pin, while some may be used as non-GPIO modules. In certain embodiments, for easy configuration and implementing the control mechanism for multi-function pins, the following steps may be performed:
1. As per the requirement for each the platform, the PRJ configurations should be updated through MDS.
2. Based on the configuration (selection) from the PRJ, the BMC stack should initialize the GPIO pins 118 for GPIO/module.
3. The control mechanism based on the SOC datasheet should be implemented for all GPIO pins 118. Based on the configuration from PRJ, only those pins selected as module will have multifunction enabled. The pins configured for GPIO will be configured for direction and logical state apart from disabling multi functionality.

By this way a lot of porting work will be reduced for each platform porting. This bring overall pin control to the stack with just the configuration varying across platforms. Currently, there is no proper GPIO initialization for each pin. In certain embodiments, GPIO initialization may be done for the pins which are not used as modules. In one embodiment, GPIO initialization is in the form of a table to have easy configuration of pins for different projects.

Referring back to FIG. 1, the non-volatile memory 116 of the management controller 110 stores the firmware 160, the pin configuration module 162, the GUI module 164 and the SCU register 166. In certain embodiments, the non-volatile memory 116 may include other applications or modules necessary for the operation of the management controller 110. It should be noted that all of the modules are each implemented by computer executable codes or instructions, which collectively forms a software image. In certain embodiments, each of the modules may further include sub-modules. Alternatively, some of the modules may be combined as one stack.

The firmware 160 includes the computer executable code that may be executed at the processor 112 to enable the operations of the management controller 110. In certain embodiments, the firmware 160 may include one or more modules or software components that may be executed independently. In certain embodiments, the pin configuration module 162, the GUI module 164 and the SCU register 166 may be a part of the firmware 160. In certain embodiments, each of the pin configuration module 162, the GUI module 164 and the SCU register 166 may respectively be a separate module independent from the firmware 160.

The pin configuration module 162 is a software module that performs update of the data in the SCU register 166 based on user instructions. In certain embodiments, the pin configuration module 162 stores all the necessary information of the functionalities, such as the definitions of the functionalities and the related GPIO pins 118 for each of the functionalities. Specifically, based on the different platforms, one or more of the GPIO pins 118 of the management controller 110 may be used to provide different functionalities. In certain embodiments, the information may be stored in a PRJ configuration file, which may be written as an image of the management controller 110. When an instruction from the user is received to select one of the functionalities, the pin configuration module 162 may determine one or more GPIO pins 118 related to the selected functionality based on the instruction, and then set a value of a corresponding bit of the SCU register 166 for each of the related GPIO pins 118 to the selected functionality to indicate a functional status of each GPIO pin 118. In this case, each GPIO pin 118 may be configured to provide the selected functionality based on the value of the corresponding bit data in the SCU register 166. In certain embodiments, the SCU register 166 may not be directly updated. Instead, the PRJ configuration file may be updated, and during U-boot or other initialization process, the updated definition of the GPIO pins 118 are used to configure the data of the SCU register 166, such that the SCU register 166 have the correct functionality definition for all the pins.

The GUI module 164 is a software module used to provide a GUI, allowing the user to input an instruction to select one of the functionalities. In certain embodiments, the GUI module 164 provides a GUI, which is used to display all of the functionalities provided by the management controller 110. Thus, a user may control the GUI to select one of the functionalities (or in certain embodiments, more than one functionality) for configuration. When one functionality is selected, the GUI may generate a corresponding instruction, and send the instruction to the pin configuration module 162. In certain embodiments, the GUI may also display the GPIO pins 118 related to the selected functionality for the user to confirm the selection of the functionality.

The SCU register 166 is a reserved memory space specific for data used in SCU control and configuration purposes. In certain embodiments, a part of the SCU register 166 may be used to store bit data for the functionalities of the GPIO pins 118 of the management controller 110. In certain embodiments, each of the GPIO pins 118 of the management controller 110 may require at least one bit of the SCU register 166, and the size of the SCU register 166 may be small but sufficiently enough to hold all the bit data for all of the GPIO pins 118 of the management controller 110.

Figure 3:
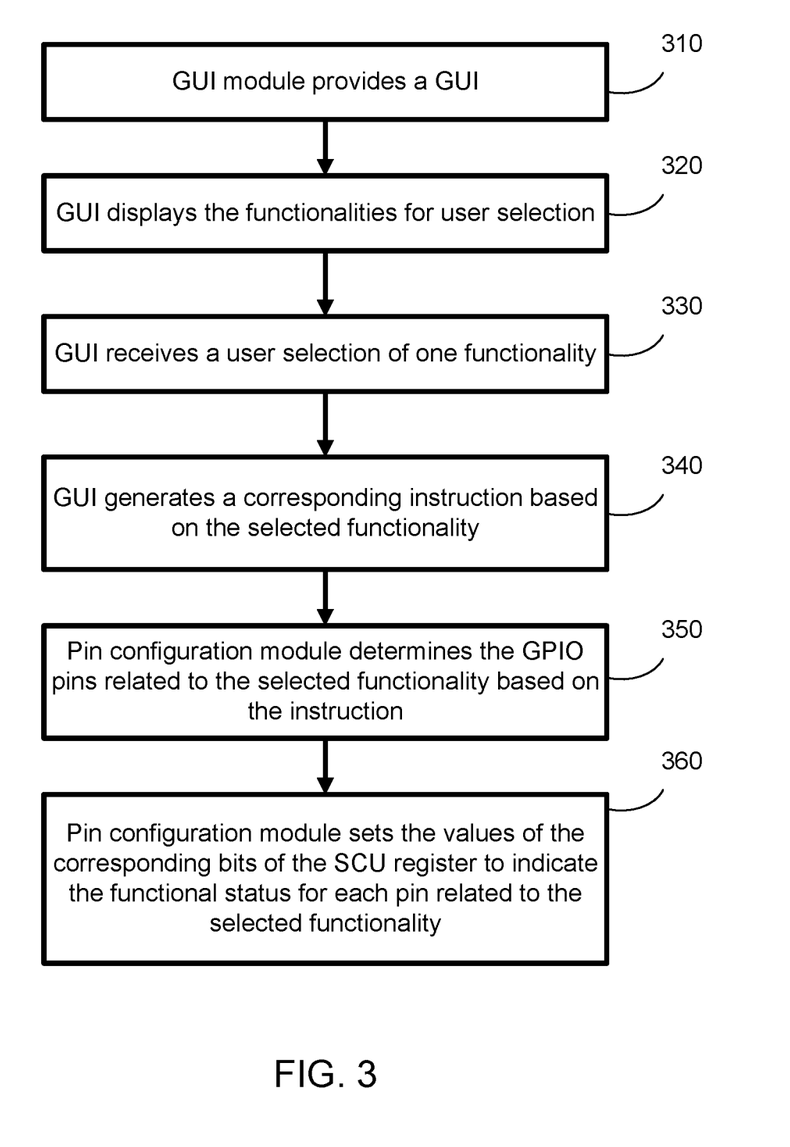
FIG. 3 depicts a flowchart of a method for configuring a plurality of pins of a management controller according to certain embodiments of the present disclosure.

In certain aspects, the present disclosure relates to a method of control multiple pins in a management device. FIG. 3 depicts a flowchart of a method for configuring a plurality of pins of a management controller according to certain embodiments of the present disclosure. In certain embodiments, the method as shown in FIG. 3 may be implemented on a system as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, at procedure 310, the GUI module 164 provides a GUI. In certain embodiments, the GUI may be displayed on a display device, such as the display device of a host computer of the management controller 110. At procedures 320, the GUI displays the functionalities for user selection. In this case, a user may select one of the functionalities from the GUI. At procedure 330, the GUI receives a user selection of one functionality. Once the user makes the selection, at procedure 340, the GUI generates a corresponding instruction based on the selected functionality, and sends the instruction to the pin configuration module 162. At procedure 350, the pin configuration module 162 may, based on the instruction, determine the GPIO pins 118 related to the selected functionality. In certain embodiments, the pin configuration module 162 may send the information of the GPIO pins 118 related to the selected functionality to the GUI, allowing the GUI to display these GPIO pins 118 related to the selected functionality to the user for confirmation. At procedure 360, the pin configuration module may set the values of the corresponding bits of the SCU register 166 to indicate the functional status for each GPIO pin 118 related to the selected functionality. In this case, each of the GPIO pins 118 is configured to provide the selected functionality based on the corresponding bit value of the SCU register 166.

As discussed above, since each GPIO pin 118 may be multi-functional, for each of the functionalities, each GPIO pin 118 related to the functionality may be configured to provide the functionality by being enabled to perform a function related to the functionality, or being disabled to avoid performing a function in conflict with the functionality. For example, when a GPIO pin 118 is configured as GPIO and not as a non-GPIO module, the non-GPIO function must be disabled to avoid performing the module function.

Referring back to FIG. 2, the GPIO pins 118 in the group of GPIO/SD/I2C may be used as a SD controller module to provide SD controller functionality, or may be used as an I2C module to provide I2C functionality. To use these GPIO pins 118 as independent GPIO, the pin configuration module 162 must set the value of the bits corresponding to each of the GPIO pins 118 as 0. For example, for the GPIOC0/SD1CLK/SCL10 and GPIOC1/SD1CMD/SDA10 pins, SCU90[0] is the corresponding bit for the SD card module. If SCU90[0] may be set to 1, the GPIOC0/SD1CLK/SCL10 and GPIOC1/SD1CMD/SDA10 pins are configured as the SD controller module. In this case, the GPIOC0/SD1CLK/SCL10 pin is configured as SD1CLK, which provides a SD clock signal function, and the GPIOC1/SD1CMD/SDA10 pin is configured as SD1CMD, which provides a SD command signal function. Similarly, for the GPIOC0/SD1CLK/SCL10 and GPIOC1/SD1CMD/SDA10 pins, SCU90[23] is the corresponding bit for the I2C module. If SCU90[23] may be set to 1, the GPIOC0/SD1CLK/SCL10 and GPIOC1/SD1CMD/SDA10 pins are configured as the I2C module. In other words, if a user wants to configure the GPIOC0/SD1CLK/SCL10 and GPIOC1/SD1CMD/SDA10 pins as GPIO, both SCU90[0] and SCU90[23] must be set to 0. In this case, both the GPIOC0/SD1CLK/SCL10 and GPIOC1/SD1CMD/SDA10 pins are configured as independent GPIO.

It should be noted that if the SCU register 166 is not correctly configured, the GPIO pins 118 related to the functionality may not work as designed. For example, if the GPIOC0/SD1CLK/SCL10 and GPIOC1/SD1CMD/SDA10 pins are intended to be used as an independent GPIO pin, and SCU90[0] is set to 1 (i.e., not set to 0), the direction and output mode will not work as designed. In this case, the SD card signals may interfere with the dedicated GPIO pin functionality and vice versa, which will lead to undefined behavior of the SD controller and independent GPIO pins.

In the example as described above, only two GPIO pins 118 are related. In certain embodiments, the management controller 110 may be a SOC that supports hundreds of GPIO pins 118. In this case, if pin sharing is not configured correctly through the SCU register 166, there will be various abnormal behaviors in the system.

In another example, the management controller 110 may be an AST2400 SOC, and MDS configuration having PRJ configuration for AST2400 SOC may be used to choose between GPIO/modules. Examples of the GPIO pins 118 of the AST2400 SOC may include the following groups of GPIO pins 118:

GPIOE/BMC UART3
GPIOF/UART4
GPIOH/SPI Flash/UART6
GPIOL/System UART1
GPIOM/System UART2
GPIOV/RMII1/RGMII1

In certain embodiments, each group of the GPIO pins 118 may include a non-GPIO functionality. For example, the GPIO pins 118 in the group of GPIOE/BMC UART3 may be used in the BMC UART3 module to provide UART3 functionality. For the first selection, if a user selects BMC UART3 as the selected functionality, the pin configuration module 162 may, based on AST2400 SOC specification, set the values of the SCU register 166 to enable the GPIO pins 118 for BMC UART3, which may include the following actions:

1. setting SCU80[16]=1 (to enable UART3 NCTS3 function pin);
2. setting SCU80[17]=1 (to enable UART3 NDCD3 function pin);
3. setting SCU80[18]=1 (to enable UART3 NDCR3 function pin);
4. setting SCU80[19]=1 (to enable UART3 NRI3 function pin);
5. setting SCU80[20]=1 (to enable UART3 NDTR3 function pin); and
6. setting SCU80[21]=1 (to enable UART3 NDSR3 function pin).

Further, the pin configuration module 162 must ensure each of SCU8C[12-14] is not set to 1 (this is to ensure pass through is not set), and ensure SCU[22] is not set to 1. In certain embodiments, the value of each of SCU8C[12-14] and SCU[22] may be set to 0.

In another example, if the user selects GPIOE as the selected functionality instead of UART3, all of the GPIO pins 118 related to UART3 must be set to 0 to disable the UART3 functions. Specifically, the GPIO pins 118 may be initialized as GPIO for direction and logical state as mentioned in the requirement. Secondly, all the other multi-functions (e.g., the UART3, or any other non-GPIO functions provided by the pins) are disabled. Similarly to the description above, all the GPIO pins 118 can be established based on the requirement and the PRJ configuration, so as to achieve configuration or control of all the GPIO pins 118.

In certain embodiments, not the entire GPIO group will be used as GPIO or as other functionality module. To have proper configuration of those pins, in one embodiment, a text box is included in the PRJ configuration. The text box defines which pins have to be used as GPIO and which pins have to be uses as multi-function. The interpretation of PRJ configuration may be performed in U-boot and if needed in platform driver. The prior configuration will enable proper functionality of these GPIO pins.

In certain embodiments, the control mechanism may be used in any SOC where the GPIO pins 118 offer more than one functionalities. It should be noted that the example as described above uses the AST2400 SOC, and the addresses of the SCU register 166 are based on the AST2400 SOC-datasheet. In certain embodiments, the addresses of the SCU register 166 and the control mechanism may be revised based on the SOC.

In another aspect, the present disclosure relates to a non-transitory computer readable medium storing computer executable code. In certain embodiments, the computer executable code may be at least a part of the firmware 160, the pin configuration module 162, the GUI module 164 and the SCU register 166 of the management controller 110 as described above. The computer executable code, when being executed, may perform one of a method described above. In certain embodiments, the non-transitory computer readable medium may include, but not limited to, non-volatile memory 116 of the management controller 110 as described above, or any other storage media of the management controller 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   a management controller, comprising a plurality of pins, a processor and a non-volatile memory storing computer executable code, wherein the management controller is configured to provide a plurality of functionalities, and each of the functionalities is related to at least one of the pins;
   wherein the computer executable code, when executed at the processor, is configured to:
      receive an instruction to select one of the plurality of functionalities;
      determine the at least one pin related to the selected one of the functionalities based on the instruction; and
      for each of the at least one pin related to the selected one of the functionalities, set a value of a corresponding register to indicate a functional status of the pin, such that each of the at least one pin is configured to provide the selected one of the functionalities based on the value of the corresponding register;
   wherein each of the pins is a general-purpose input/output (GPIO) pin, and the functionalities comprise a GPIO functionality and at least one non-GPIO functionality; and
   wherein the functionalities are configured using a project (PRJ) file that includes a text box defining a first group of pins used as GPIO and a second group of pins used as non-GPIO.

2. The system of claim 1, wherein for each of the functionalities, each of the pins related to the functionality is configured to provide the functionality by being enabled to perform a function related to the functionality, or being disabled to avoid performing a function in conflict with the functionality.

3. The system of claim 1, wherein the at least one non-GPIO functionality comprises a Secure Digital (SD) controller functionality.

4. The system of claim 3, wherein the pins comprise a first multi-function pin and a second multi-function pin related to both the SD controller functionality and the GPIO functionality, wherein:
   when the SD controller functionality is selected, the first multi-function pin is configured to provide a SD clock signal function, and the second multi-function pin is configured to provide a SD command signal function; and
   when the GPIO functionality is selected, each of the first multi-function pin and the second multi-function pin is respectively configured to provide an independent GPIO function.

5. The system of claim 1, wherein the at least one non-GPIO functionality comprises an Inter-Integrated Circuit (I2C) functionality.

6. The system of claim 1, wherein the at least one non-GPIO functionality comprises a universal asynchronous receiver/transmitter (UART) functionality.

7. The system of claim 1, wherein the corresponding register for each of the pins is a system control unit (SCU) register.

8. The system of claim 1, wherein the computer executable code, when executed at the processor, is further configured to:
   provide a graphic user interface, and display the functionalities in the graphic user interface.

9. The system of claim 8, wherein the computer executable code, when executed at the processor, is further configured to:
   for the selected one of the functionalities, display each of the pins related to the selected one of the functionalities in the graphic user interface.

10. A method for configuring a plurality of pins of a management controller, comprising:
    receiving, at the management controller, an instruction to select one of a plurality of functionalities provided by the management controller, wherein each of the functionalities is related to at least one of the pins;

determining, by the management controller, the at least one pin related to the selected one of the functionalities based on the instruction; and for each of the at least one pin related to the selected one of the functionalities, setting, by the management controller, a value of a corresponding register to indicate a functional status of the pin, such that each of the at least one pin is configured to provide the selected one of the functionalities based on the value of the corresponding register;

wherein each of the pins is a general-purpose input/output (GPIO) pin, and the functionalities comprise a GPIO functionality and at least one non-GPIO functionality; and wherein the functionalities are configured using a project (PRJ) file that includes a text box defining a first group of pins used as GPIO and a second group of pins used as non-GPIO.

11. The method of claim 10, wherein for each of the functionalities, each of the pins related to the functionality is configured to provide the functionality by being enabled to perform a function related to the functionality, or being disabled to avoid performing a function in conflict with the functionality.

12. The method of claim 10, wherein the at least one non-GPIO functionality comprises a Secure Digital (SD) controller functionality, an Inter-Integrated Circuit (I2C) functionality, and a universal asynchronous receiver/transmitter (UART) functionality.

13. The method of claim 10, further comprising:
providing, by the management controller, a graphic user interface;
displaying the functionalities in the graphic user interface; and
for the selected one of the functionalities, displaying each of the pins related to the selected one of the functionalities in the graphic user interface.

14. A non-transitory computer readable medium storing computer executable code, wherein the computer executable code, when executed at a processor of a management controller having a plurality of pins, is configured to:

receive an instruction to select one of a plurality of functionalities provided by the management controller, wherein each of the functionalities is related to at least one of the pins of the management controller; and determine the at least one pin related to the selected one of the functionalities based on the instruction; and for each of the at least one pin related to the selected one of the functionalities, set a value of a corresponding register to indicate a functional status of the pin, such that each of the at least one pin is configured to provide the selected one of the functionalities based on the value of the corresponding register;

wherein each of the pins is a general-purpose input/output (GPIO) pin, and the functionalities comprise a GPIO functionality and at least one non-GPIO functionality; and wherein the functionalities are configured using a project (PRJ) file that includes a text box defining a first group of pins used as GPIO and a second group of pins used as non-GPIO.

15. The non-transitory computer readable medium of claim 14, wherein for each of the functionalities, each of the pins related to the functionality is configured to provide the functionality by being enabled to perform a function related to the functionality, or being disabled to avoid performing a function in conflict with the functionality.

16. The non-transitory computer readable medium of claim 14, wherein the at least one non-GPIO functionality comprises a Secure Digital (SD) controller functionality, an Inter-Integrated Circuit (I2C) functionality, and a universal asynchronous receiver/transmitter (UART) functionality.

17. The non-transitory computer readable medium of claim 14, wherein the computer executable code, when executed at the processor, is further configured to:
provide a graphic user interface, and display the functionalities in the graphic user interface; and
for the selected one of the functionalities, display each of the pins related to the selected one of the functionalities in the graphic user interface.

* * * * *